R. G. FERGUSON.
COMBINATION VACUUM VENTILATING EXHAUST.
APPLICATION FILED NOV. 4, 1912.
1,087,228.
Patented Feb. 17, 1914.
3 SHEETS—SHEET 1.
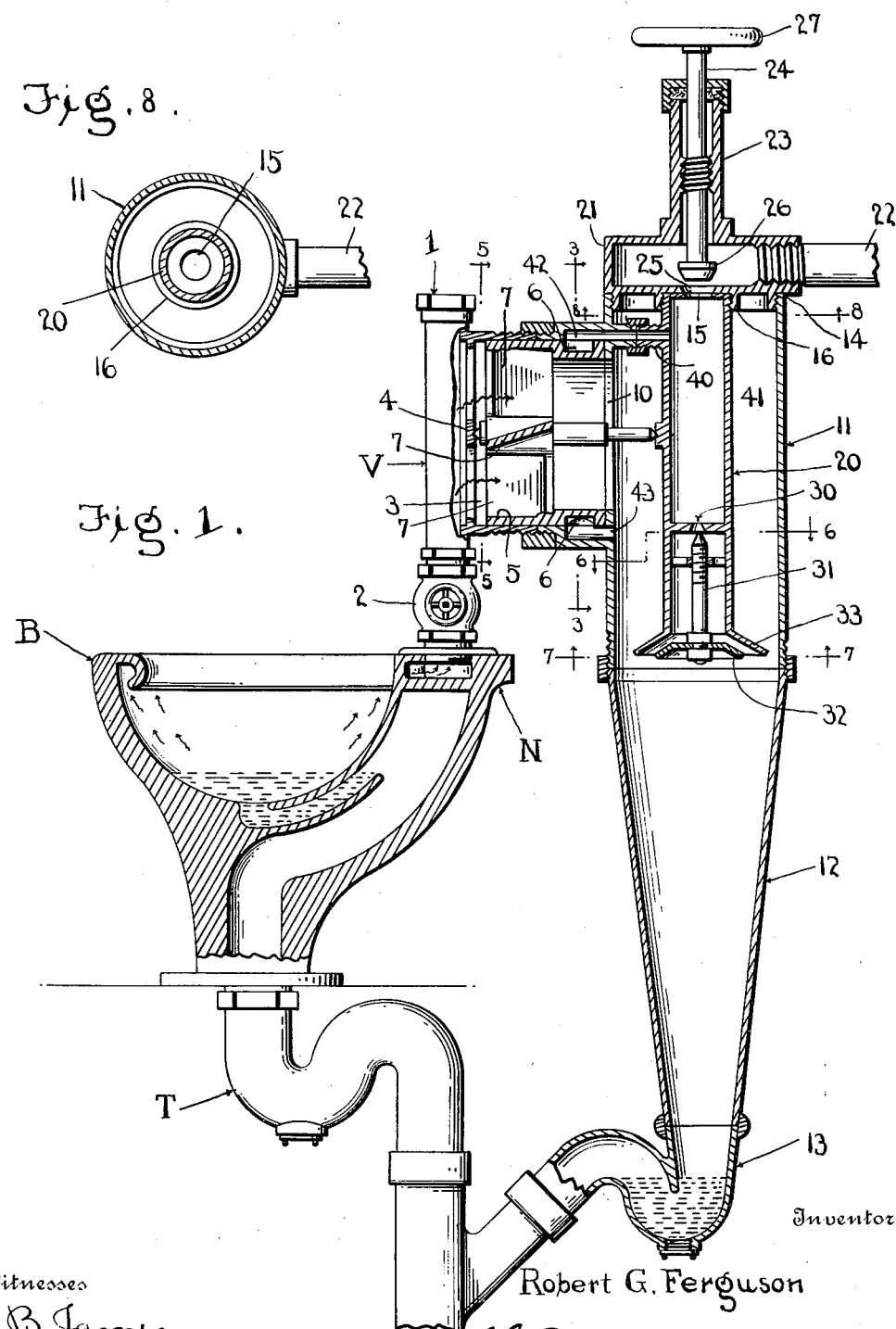
Witnesses
L. B. James
N. L. Collamer
Inventor
Robert G. Ferguson
By H. B. Willson & Co.
Attorneys

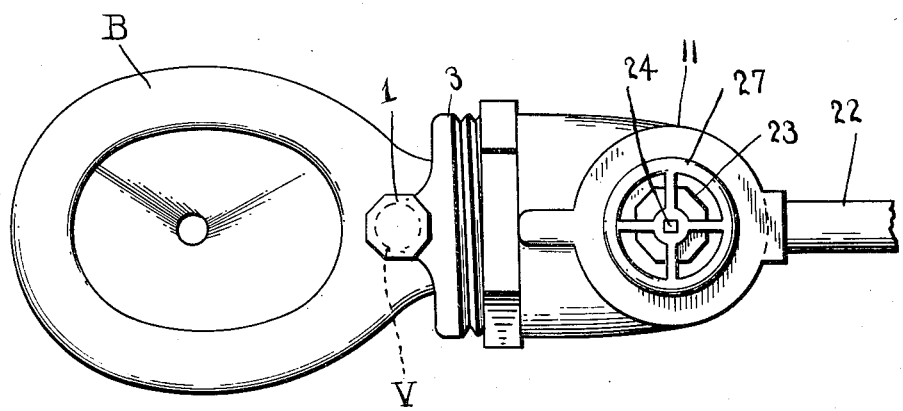
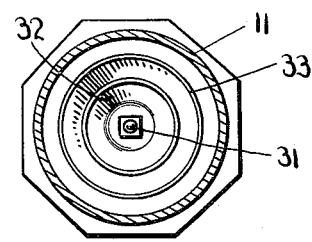
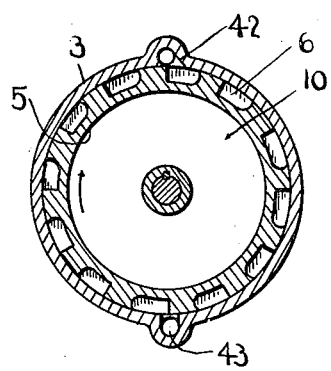
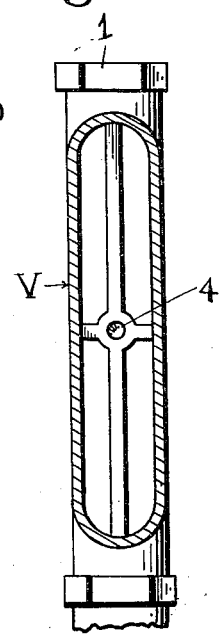
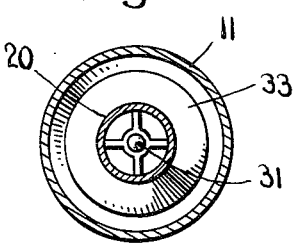
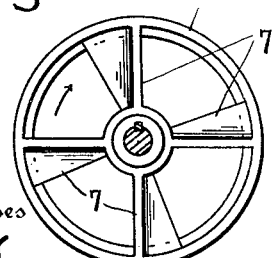

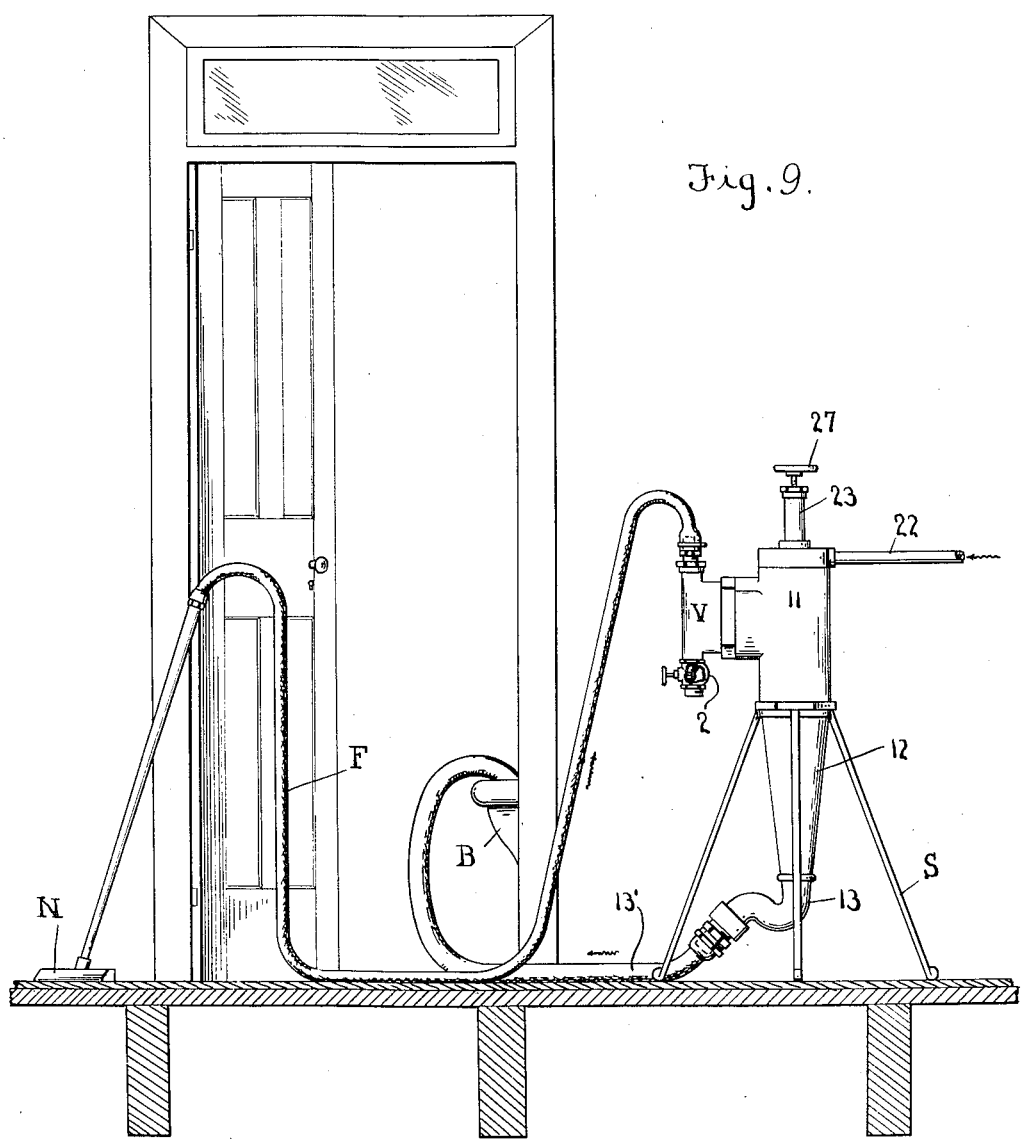

UNITED STATES PATENT OFFICE.

ROBERT G. FERGUSON, OF LAKEWOOD, NEW JERSEY.

COMBINATION VACUUM VENTILATING-EXHAUST.

1,087,228.  Specification of Letters Patent. Patented Feb. 17, 1914.

Application filed November 4, 1912. Serial No. 729,422.

*To all whom it may concern:*

Be it known that I, ROBERT G. FERGUSON, a citizen of the United States, residing at Lakewood, in the county of Ocean and State of New Jersey, have invented certain new and useful Improvements in Combination Vacuum Ventilating-Exhausts; and I do declare the following to be a full, clear, and exact description of the invention, such as will enable others skilled in the art to which it appertains to make and use the same.

This invention relates to water closets, and more especially to ventilators for extracting the impure air from the closet bowl, and one object of the same is to produce a device wherein the air will be exhausted from the bowl by the creation of a partial vacuum above it within the ventilator pipe, and the air so extracted will be driven downward into the soil pipe and eventually into the sewer by the combined action of pressure set up by a fan and suction created by a series of jets.

A further object of the invention is to produce a device capable of being used as a vacuum cleaner, by attaching thereto a section of hose and a nozzle and leading the latter to the point to be cleaned.

These objects are carried out by constructing the machine in the manner hereinafter more fully described and claimed, and as shown in the drawings wherein—

Figure 1 is a central vertical section of this device complete, and Fig. 2 is a plan view thereof. Fig. 3 is a vertical section on the line 3—3 of Fig. 1. Fig. 4 is an end elevation of the suction fan or wheel. Fig. 5 is a vertical section on the line 5—5 of Fig. 1. Figs. 6, 7 and 8 are horizontal sections on the lines 6—6, 7—7 and 8—8 respectively of Fig. 1. Fig. 9 is an elevation showing the use of this device as a vacuum cleaner.

In the drawings I have shown an ordinary water closet bowl B whose neck N is connected with a ventilator pipe V, the outlet of the bowl being through a trap T into the soil pipe S and eventually into the sewer as usual. The means for flushing this bowl are not illustrated as they form no part of the present invention. In practice I close the upper end of the lowermost section of the ventilator pipe V by means of a cap 1, and between the neck N and this pipe-section I preferably interpose a valve 2 by means of which communication between the bowl and the pipe-section may be closed when the cap 1 is removed, so that a section of hose carrying a nozzle may be attached to the upper end of this pipe section and the mechanism yet to be described can be employed for vacuum cleaning purposes. I mention this merely as typical of one other use to which this invention may be put besides its preferred function of ventilating a water closet bowl, but it will be understood that it is susceptible of a number of uses which need not be elaborated. Connected with the ventilator pipe-section V is a casing 3 within which in suitable bearings 4 is mounted the shaft of a combined water wheel and suction fan whose details of construction are best illustrated in Figs. 3 and 4. The rim 5 of this wheel is provided in its outer face with a number of pockets 6, and the spokes 7 of the wheel are set oblique so that they act like the flukes of a propeller or the blades of a fan to draw air through the casing 3 in the direction of the arrow when the wheel rotates as it will under the impact of water directed into the pockets 6. The rear end of the casing 3 communicates through large openings 10 with the interior of the shell 11 of the injector forming an important part of this invention, said shell being cylindrical at its upper end as shown and tapering at its lower end so as to constitute what might be called a nozzle 12. The lower or smaller end of this nozzle communicates through a trap 13 with the soil pipe S in the manner diagrammatically shown in Fig. 1. The upper end of the ejector shell is closed as at 14 excepting for a central water inlet opening 15 surrounded by a threaded nipple 16 for a purpose to appear below; and it follows that the course of the air from the bowl B through the ventilator pipe V and the fan, will be through the opening 10 into said cylindrical shell 11, and thence into the nozzle 12 and through the trap 13 into the sewer. But as water stands constantly within the trap 13, it becomes necessary to rotate the fan with sufficient rapidity to set up pressure within the injector and drive out the water in the trap so that the air sucked in by the fan can be driven down into the sewer.

Within the shell 11 and preferably concentrically disposed therein is a tank 20 of sufficient size to contain a water column having some considerable volume, and when the nipple 16 is provided it will be well to screw the upper end of the tank into said nipple and pierce it with an opening 25 registering with the opening 15 above referred to. The head 14 of the shell carries an inlet pipe of inverted T-shape one end of whose head is closed as at 21 while the other end connects with the water system through a pipe 22, and the shank 23 of which is internally threaded and forms a guide for a valve stem 24 standing upright as shown. The head of this stem constitutes a valve 26 which may be turned down onto the valve seat formed by the upper inlet opening 15, by means of a handle 27 if the device is to be manipulated by hand.

The lower end of the tank 20 has an outlet opening 30 whose size may be adjusted by means of a valve 31, and the head of this valve carries a spreader 32 standing beneath a flaring skirt 33 carried by the lower end of the tank within the cylindrical shell 11; and it follows that when said valve 31 is adjusted to open or close the outlet 30 to a greater or lesser degree, the spreader 32 is also adjusted in its relation to the skirt 33. In any event, however, I would make the outlet at 30 smaller than the inlet when the valve 26 is opened to its fullest extent, with the result that water admitted through the pipe 22 accumulates within the tank 20 for a purpose now to be explained.

From the tank 20 at a point near but slightly beneath its upper end leads a lateral pipe 40 which passes across the annular space 41 within the shell 11 around said tank, and is directed as at 42 obliquely toward the series of pockets 6 in the periphery of the wheel, whereby the impact of the water flowing through this branch pipe 40 is directed upon the wheel so as to cause the rotation of the latter. The water caught in the pockets as they pass the point 42 travels around within the casing 3 and flows out at the point 43 into said annular space 41, from which it falls on the skirt 33, and into the interior of the nozzle 12 and eventually escapes through the trap 13 to the sewer in a manner which will be clear.

With this construction of parts, assuming that the connections are made as shown in Fig. 1, when the user of this device manipulates the valve by its handle 27 water in the pipe 22 enters through the alined openings 15 and 25 and commences immediately to accumulate within the tank 20 because the outlet opening 30 is not so large as the inlet. Passing through the outlet, the water is sprayed outward by the spreader 32 in umbrella shape, and falls within the nozzle 12 in the form of a rather heavy mist. The water accumulates within the tank 20 meanwhile, until it overflows out the lateral pipe 40, with the result that the wheel begins to rotate, and this causes the rotation of the fan so that suction is set up from the bowl B upward through the ventilating pipe V, through the fan and the opening 10 into the annular space 41 within the shell 11, and thence downward because the air has no escape upward. The air accumulating within the injector, added to the mist being formed within its nozzle 12, very soon sets up sufficient pressure to flush the water standing within the trap 13, with the result that the vitiated air thus drawn from the water closet bowl and moistened by the jets within the nozzle 12 is driven downward and forced out of the injector into the sewer. When now the valve 26 is closed, the inlet of water through the pipe 22 is cut off. But the continued flow of water from the tank 20 through the outlet 30 causes the water level within said tank to fall until eventually the pipe 40 is exposed so that air may pass through said pipe to take the place of the water flowing out of the tank but no more water may pass through this pipe to rotate the wheel which therefore comes to rest. The water continues to flow out the outlet 30 and over the spreader 32 until it is exhausted from the tank 20, and the spray thus formed thoroughly moistens the air within the injector. However, as soon as the wheel ceased to rotate the pressure of the air within the injector became less, and the water flowing down within the nozzle 12 reëstablished the seal within the trap 13 so that now, even though the idle fan leaves the interior of the injector in communication with the interior of the ventilator pipe V and the interior of the bowl B, the injector is cut off from the sewer by the trap 13 and the bowl is cut off from the sewer by the trap T and none of the gases within the sewer can escape into any part of this device or into the room.

Thus it will be seen that I have devised mechanism for extracting the air from a water closet bowl by flowing water used in two ways—first it is broken up into spray at the lower or nozzle-end of the injector and creates a suction of the air, and second it rises within the tank 40 until it flows into the casing of the water wheel and rotates the latter, so that a fan is set in motion to draw the air from the bowl and force it downward within the injector and flush out the water within the trap 13. In the suggested use of this device whereby it might be cut off from or perhaps used in conjunction with the water closet bowl B and connected with a hose and nozzle so that it becomes a vacuum cleaning machine, the use of a spray for assisting in creating the suction required is of advantage because the air drawn in from the vacuum machine will be full of dust and it is highly desirable that it be moistened so that it can be handled well and passed into the sewer in a wet condition. It is within the possibilities of this invention, especially when it is used as a vacuum cleaner as seen in Fig. 9, that the inlet pipe 22 be connected with some source of water supply and the outlet end of the injector with some point to which the dust-laden spray may be delivered (as for instance by a section of hose 13' leading from the trap 13 to the bowl B) and the mechanism hereinbefore described utilized as a vacuum exhaust by connecting a nozzle N with one end of the ventilator pipe V in any suitable manner as by a flexible pipe F. In this use of the device it would not necessarily be located adjacent the water closet bowl, as it might be mounted on any suitable support S and the inlet pipe 22 led to it from a suitable source such as a faucet in the house system of water supply. I desire to emphasize the fact that this device is susceptible of other uses than that illustrated in the drawings, and yet I consider it hardly necessary to amplify the drawings to show such additional uses because they are obvious. So also if the device be connected simply with a room which it is desired to ventilate—the dust drawn from that room and passed into the interior of the injector becomes moistened by the spray from the spreader 32 and will be, as it were, washed out of the injector through the trap 13, rather than permitted to accumulate therein so as to clog the parts and render frequent cleaning necessary. One other feature of the present invention consists in its provision for overcoming what pressure might exist within the sewer system by reason, for instance, of the setting back of the sewage therein in times of heavy rains, etc. Even though the pressure is considerable, this device will successfully blow the disagreeable odors and gases down into the sewer when it is connected up with the bowl, or will blow into said sewer the dust of the vacuum cleaner when it is connected therewith.

What is claimed as new is:

1. In a ventilating exhaust, the combination with an upright injector, a waste at its lower end, and a casing adapted to connect its interior with a ventilator pipe; of a suction fan located within said casing, and means for causing the rotation of said fan at will.

2. In a ventilating exhaust, the combination with an upright injector, a trap at its lower end, and a casing adapted to connect its interior with a ventilator; of a suction fan located within said casing, a water-wheel connected with the shaft of said fan, and means for directing water onto said wheel at will.

3. In a ventilating exhaust, the combination with an upright injector, and a casing adapted to connect its interior with a ventilator; of a suction fan located within said casing, a water-wheel connected with the shaft of said fan, means for flowing water throughout the length of said injector at will, and a branch pipe leading water from the injector to and upon said wheel and back to the interior of the injector for rotating said wheel.

4. In a ventilating exhaust, the combination with an upright injector adapted to be connected at its lower end with a waste, and a casing connecting its interior with a ventilator pipe; of a combined suction fan and water wheel rotatably mounted within said casing, an upright tank mounted within said injector and having a restricted outlet at its lower end and a water inlet valve at its upper end, and a branch pipe connecting the interior of said tank near its upper end with said casing, for the purpose set forth.

5. In a ventilating exhaust system, the combination with an upright injector adapted to be connected at its lower end with a waste, a casing, connections between its interior and a ventilator, and a combined exhaust fan and water wheel journaled in said casing; of an upright water tank disposed within said injector at its upper end and having an outlet at its lower end, a spreader beneath said outlet, means for controlling the admission of water to the upper end of said tank, and a lateral pipe leading from such tank at a point near its upper end to the casing of the water wheel, for the purpose set forth.

6. In a vacuum ventilating exhaust, the combination with an upright injector comprising a cylindrical shell closed at its upper end, a tapering nozzle leading from the lower end of the shell downward, and connections between the lower end of said nozzle and the sewer system; of a cylindrical tank disposed concentrically within said shell, the upper end of the tank and the shell being pierced with alined openings, a manually-controlled valve for closing said openings, a water feed pipe leading to said valve, a lateral pipe leading from the tank at a point near its upper end through the shell of the cylinder, a water-driven suction fan with whose casing said pipe communicates, the passage through such fan leading into the interior of the shell, and means for regulating the outlet of water from the lower end of said tank.

In testimony whereof I have hereunto set my hand in presence of two subscribing witnesses.

ROBERT G. FERGUSON.

Witnesses:
 ETHEL B. CLAYTON,
 WILLIAM E. NOWLAN.